(12) United States Patent
Nishiyama

(10) Patent No.: US 8,606,035 B2
(45) Date of Patent: Dec. 10, 2013

(54) IMAGE PROCESSING APPARATUS AND IMAGE PROCESSING METHOD

(75) Inventor: Tomohiro Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/915,733

(22) Filed: Oct. 29, 2010

(65) Prior Publication Data

US 2011/0129166 A1 Jun. 2, 2011

(30) Foreign Application Priority Data

Nov. 30, 2009 (JP) ................................. 2009-272801

(51) Int. Cl.
*G06K 9/40* (2006.01)
(52) U.S. Cl.
USPC .................... 382/261; 382/275; 348/208.4
(58) Field of Classification Search
USPC ............. 382/260, 261, 275, 300; 348/208.99, 348/208.4
See application file for complete search history.

(56) References Cited

U.S. PATENT DOCUMENTS

| | | | |
|---|---|---|---|
| 7,596,307 B2 | 9/2009 | Tomita et al. | |
| 7,639,289 B2 | 12/2009 | Agrawal et al. | |
| 7,711,253 B2 | 5/2010 | Tomita et al. | |
| 7,756,407 B2 | 7/2010 | Raskar | |
| 2007/0103562 A1* | 5/2007 | Kaneko et al. | 348/222.1 |
| 2007/0258706 A1* | 11/2007 | Raskar et al. | 396/52 |
| 2008/0056613 A1* | 3/2008 | Hatanaka et al. | 382/284 |
| 2008/0074441 A1* | 3/2008 | Chujo et al. | 345/634 |
| 2008/0170124 A1* | 7/2008 | Hatanaka et al. | 348/208.4 |
| 2009/0115858 A1* | 5/2009 | Lee | 348/208.4 |
| 2010/0053346 A1* | 3/2010 | Mitsunaga | 348/208.6 |
| 2010/0277602 A1* | 11/2010 | Asano et al. | 348/208.4 |
| 2010/0295954 A1* | 11/2010 | Kotani | 348/208.4 |
| 2010/0321510 A1* | 12/2010 | Tsutsumi | 348/208.4 |
| 2011/0109755 A1* | 5/2011 | Joshi et al. | 348/208.5 |

FOREIGN PATENT DOCUMENTS

| | | |
|---|---|---|
| JP | 2004-205799 | 7/2004 |
| JP | 2006-279807 | 10/2006 |
| JP | 2008-236289 A | 10/2008 |
| JP | 2008-310797 | 12/2008 |

* cited by examiner

*Primary Examiner* — Jon Chang
(74) *Attorney, Agent, or Firm* — Fitzpatrick, Cella, Harper & Scinto (57) ABSTRACT

An exposure condition when obtaining a sensed image is input. Shake information when obtaining the sensed image is input. A filter to be used to correct a blur of the sensed image is generated based on the exposure condition and a weight value including a non-integer obtained from the shake information.

13 Claims, 11 Drawing Sheets

IMAGE GROUP OBTAINED BY CONTINUOUS SHOOTING

IMAGE PROCESSING APPARATUS AND IMAGE PROCESSING METHOD

BACKGROUND OF THE INVENTION

1. Field of the Invention

The present invention relates to a camera shake correction technique.

2. Description of the Related Art

A recent increase in the resolution and zooming ratio of an image sensing device has posed a problem of blur of a sensed image caused by camera shake upon image sensing, and conventionally led to wide use of image sensing devices with a camera shake correction function. Such an image sensing device with a camera shake correction function generally uses an optical camera shake correction scheme of optically correcting a camera shake using a sensor configured to detect a shift vector generated by a camera shake and a driving device configured to control the relative positions of the lens and an image sensor so as to cancel the camera shake.

On the other hand, a method of correcting a camera shake by image processing has also been examined. To correct a camera shake for one blurred image, a method is known which, interpreting the process of image degradation caused by a camera shake as convolution by a filter, calculates a filter based on the speed of camera shake, and removes the camera shake by deconvolution (Japanese Patent Laid-Open Nos. 2006-279807 and 2004-205799).

Generally, the frequency characteristic of a shake filter has the property of decreasing to zero at a certain frequency. This poses a problem that the information of the frequency at which the frequency characteristic becomes zero is lost. To prevent this, there is proposed a technique of correcting a camera shake or object blur by opening/closing the shutter at random during exposure when acquiring an image and performing a deconvolution operation using the shutter open/close information (Japanese Patent Laid-Open No. 2008-310797). This technique is called Coded Exposure. Using a favorable Coded Exposure pattern enables to prevent the frequency characteristic of a shake filter from decreasing to zero and implement shake correction.

However, the methods disclosed in Japanese Patent Laid-Open Nos. 2006-279807 and 2004-205799 have the following problem. First, the methods disclosed in Japanese Patent Laid-Open Nos. 2006-279807 and 2004-205799 do not control the exposure condition such as shutter open/close. For this reason, the frequency characteristic of a shake filter at a specific frequency decreases to zero (this phenomenon will be referred to as a zero power frequency hereinafter), and simple deconvolution is impossible. To avoid this problem, Japanese Patent Laid-Open No. 2006-279807 uses a pseudo inverse matrix, and Japanese Patent Laid-Open No. 2004-205799 uses a Wiener filter. However, it is not possible to restore the information of the frequency at which a zero power frequency has occurred in either case.

On the other hand, the method of Japanese Patent Laid-Open No. 2008-310797 uses Coded Exposure to avoid the problem of zero power frequency as in the Japanese Patent Laid-Open Nos. 2006-279807 and 2004-205799. However, the method is not applicable to a camera shake of non-uniform motion.

SUMMARY OF THE INVENTION

The present invention has been made in consideration of the above-described problems, and provides a technique of obtaining an accurate image by correcting a blur and, more particularly, a camera shake of non-uniform motion even from one image.

According to the first aspect of the present invention, an image processing apparatus comprises: an exposure condition input unit that inputs an exposure condition when obtaining a sensed image; a shake information input unit that inputs shake information when obtaining the sensed image; and a filter generation unit that generates a filter to be used to correct a blur of the sensed image based on the exposure condition and a weight value including a non-integer obtained from the shake information.

According to the second aspect of the present invention, an image processing method comprises the steps of: inputting an exposure condition when obtaining a sensed image; inputting shake information when obtaining the sensed image; and generating a filter to be used to correct a blur of the sensed image based on the exposure condition and a weight value including a non-integer obtained from the shake information.

Further features of the present invention will become apparent from the following description of exemplary embodiments with reference to the attached drawings.

DESCRIPTION OF THE EMBODIMENTS

An embodiment of the present invention will now be described with reference to the accompanying drawings. Note that the embodiment to be described below is an example of detailed practice of the present invention, and is one of detailed examples of arrangements defined in the scope of claims.

[First Embodiment]
<Arrangement of Image Processing Apparatus of Embodiment>

In this embodiment, an image processing apparatus for correcting a blur from one image will be described. Note that in this embodiment, the camera shake is limited to a shift shake. First, an example of the functional arrangement of a correction unit 100 provided in the image processing apparatus according to this embodiment will be explained with reference to FIG. 1. The correction unit 100 performs processing of correcting a camera shake that is a shift shake from one image, as described above.

Figure 1:
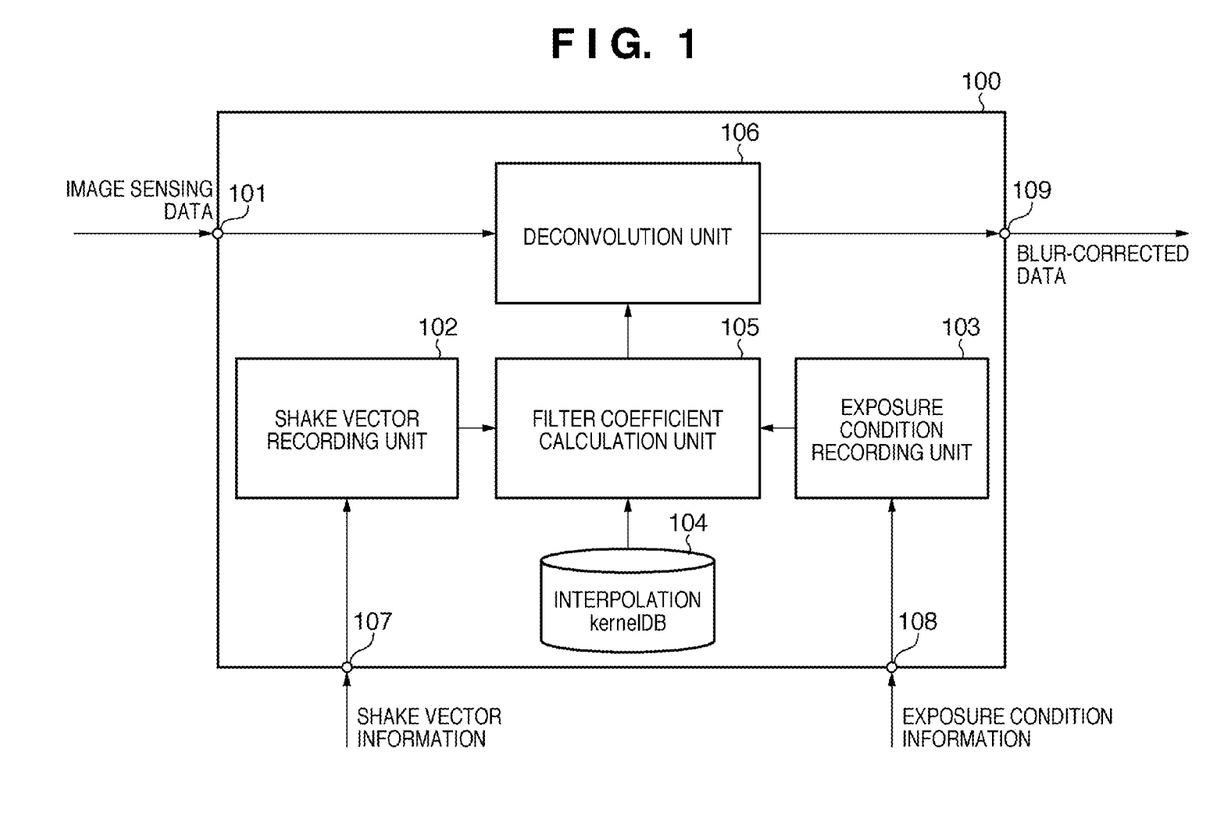
FIG. 1 is a block diagram showing an example of the functional arrangement of a correction unit 100.

Data of a sensed image (image sensing data) is input to an input terminal 101. The image data is input to a deconvolution unit 106 at the succeeding stage. A shake vector recording unit 102 receives, via an input terminal 107, shake vector information measured by another component of the image processing apparatus according to the embodiment, and records the received shake vector information.

An exposure condition recording unit 103 receives, via an input terminal 108, "information representing an exposure condition at the time of image sensing (exposure condition information)" acquired by another component of the image processing apparatus according to the embodiment. The "exposure condition" indicates an exposure amount at each time relative to an exposure amount "1" in a shutter full open state. The exposure condition recording unit 103 records the received exposure condition information.

An interpolation Kernel DB (database) 104 stores (holds) values of interpolation Kernel functions necessary for calculating the pixel values of non-integer pixels. A filter coefficient calculation unit 105 calculates a shake filter coefficient using the shake vector information recorded in the shake vector recording unit 102, the exposure condition information recorded in the exposure condition recording unit 103, and a value stored in the interpolation Kernel DB 104.

The deconvolution unit 106 performs, for the image data input via the input terminal 101, deconvolution processing by a filter using the filter coefficient calculated by the filter coefficient calculation unit 105, thereby generating image data whose blur has been corrected. The image data whose blur has been corrected by the deconvolution unit 106 is output to the memory or display device of the image processing apparatus of the embodiment via an output terminal 109 as blur-corrected data.

<Processing to be Executed by Correction Unit 100>

Figure 2:
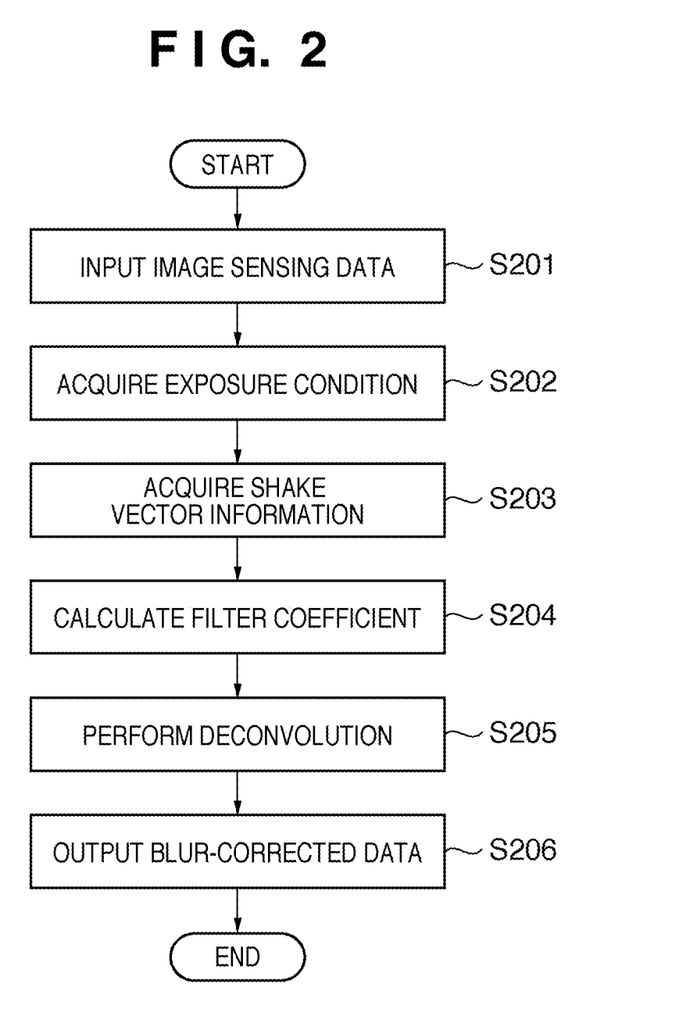
FIG. 2 is a flowchart of processing to be executed by the correction unit 100.

Processing to be executed by the correction unit 100 will be described next with reference to FIG. 2. In step S201, the deconvolution unit 106 acquires image sensing data via the input terminal 101.

In step S202, the exposure condition recording unit 103 acquires, via the input terminal 108, exposure condition information representing an exposure condition at each time during image sensing, and records the acquired exposure condition information.

In step S203, the shake vector recording unit 102 acquires, via the input terminal 107, shake vector information at each time during image sensing, and records the acquired shake vector information.

In step S204, the filter coefficient calculation unit 105 calculates a shake filter coefficient using the shake vector information recorded in the shake vector recording unit 102, the exposure condition information recorded in the exposure condition recording unit 103, and a value stored in the interpolation Kernel DB 104. The operation of the filter coefficient calculation unit 105 will be described later in detail.

In step S205, the deconvolution unit 106 performs, for the image sensing data acquired in step S201, deconvolution processing by a filter using the filter coefficient calculated in step S204 by the filter coefficient calculation unit 105. With this processing, image data whose blur has been corrected is generated.

In step S206, the deconvolution unit 106 outputs the image data whose blur has been corrected to the memory or display device of the image processing apparatus of the embodiment via the output terminal 109 as blur-corrected data.

<Operation of Filter Coefficient Calculation Unit 105>

As for shift shake motion, let t be the time, s(t) be the shift shake vector in the image at the time t, and x(t) be a two-dimensional vector indicating a position in the image at the time t. Then, $$x(t) = x(0) + s(t) \quad (1)$$

holds.

Figure 3A:
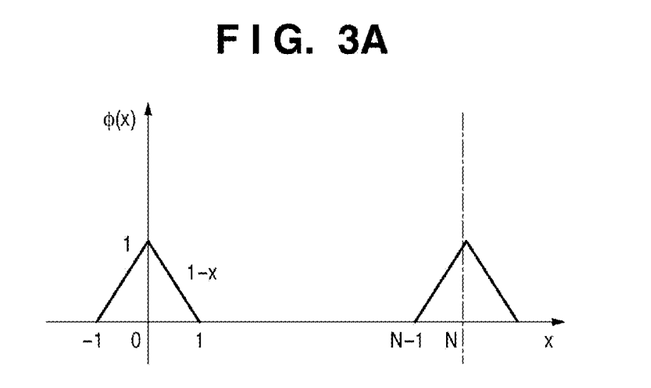
FIG. 3A shows graphs of an example of periodical interpolation Kernels.

The time t of the start of image sensing is defined as 0. Let I be a blur-free image at time t=0, and I(m) be the pixel value at coordinates (coordinate vector) m in the image I. A coordinate vector m(0) at time t=0 of the "pixel located at the coordinates m in the image at the time t" is given by m(0)=m−s(t) based on equation (1). Both the x- and y-components of the coordinate vector m are assumed to have integer values. That is, the coordinate vector m represents the coordinate values of a lattice point. The pixel value contributing to the coordinate position represented by the coordinate vector m is obtained by integrating pixel values I(m−s(t)) from time t=0 to an exposure time T. Hence, the shift shake is given by $$I_{blur}(m) = \frac{1}{T} \int_0^T h(t) I(m - s(t)) dt \quad (2)$$

where h(t) is a function for determining the exposure condition, which represents the exposure condition of Coded Exposure. Details will be described later. Iblur is an image blurred by shift motion. To cope with a non-integer shift shake, a periodical interpolation Kernel φ(x) is introduced so as to define the pixel value of a non-integer pixel by $$I(x) \equiv \sum_{n \in Z/NZ \times Z/MZ} \varphi(x - n) I(n) \quad (3)$$

where Z is a set of integers, Z/NZ is a symbolic expression of a set [0, 1, 2, ..., N−1]. In this case, 0 and N are regarded to be the same. Equation (3) is the same as a normal interpolation expression except the condition "periodical". "Periodical" of the periodical interpolation Kernel means to satisfy $$\phi(x + kM + lN) = \phi(x) \; M = (M, 0), N = (0, N), k, l \in Z \quad (4)$$

where M and N are the horizontal and vertical sizes of the image. That is, the pixel positions and interpolation Kernel values between the pixel positions in one image are defined. The reason why the interpolation Kernel is periodical will be described later. The periodical interpolation Kernel of one-dimensional linear interpolation will be described with reference to FIG. 3A. In FIG. 3A, the abscissa represents the coordinates, and the ordinate represents the interpolation Kernel value. Since the interpolation Kernel is periodical, the graph near x=N matches that near x=0. Not only the interpolation Kernel of linear interpolation but also an arbitrary interpolation Kernel of, e.g., bicubic interpolation may be used. When equation (3) is substituted into equation (2), we obtain $$I_{blur}(m) = \frac{1}{T}\int_0^T h(t) \sum_{n \in Z/NZ \times Z/MZ} \varphi(m - n - s(t))I(n)dt \quad (5)$$

$$= \frac{1}{T} \sum_{n \in Z/NZ \times Z/MZ} I(n) \int_0^T h(t)\varphi(m - n - s(t))dt$$

In equation (5), a filter K is defined by $$K(m) \equiv \frac{1}{T}\int_0^T h(t)\varphi(m - s(t))dt \quad (6)$$

In this case, equation (5) can be rewritten as $$I_{blur}(m) = \sum_{n \in Z/NZ \times Z/MZ} I(n)K(m - n) \quad (7)$$

That is, the expression returns to a form of cyclic convolution. The periodical interpolation Kernel is used to obtain the form of cyclic convolution in equation (7). According to equation (6), the filter K can be obtained based on the information of shift locus s(t) and exposure condition h(t). Hence, deconvolution by the filter K allows to obtain I from Iblur using equation (7). At this time, an arbitrary existing algorithm is used as the deconvolution algorithm. Examples are division on a frequency space, Lucy-Richardson algorithm, algorithm using a Wiener filter, and algorithm using iteration by MAP. That is, any other algorithm is usable if deconvolution is possible. Deconvolution by division on a frequency space will particularly be described here.

Fourier transformation of equation (7) yields $$F[I_{blur}](u) = F[I](u)F[K](u)$$

where F[ ] represents Fourier transformation, and u is a variable on a frequency space. When both sides of the equation are divided by F[K] to perform inverse Fourier transformation, we obtain $$I(m) = F^{-1}\left[\frac{F[I_{blur}](u)}{F[K](u)}\right]$$

where $F^{-1}[\ ]$ represents inverse Fourier transformation. The blur-corrected image I can be obtained from this equation.

The operation principle of the filter coefficient calculation unit 105 has been described above.

<Processing Procedure of Filter Coefficient Calculation Unit 105>

Figure 3B:
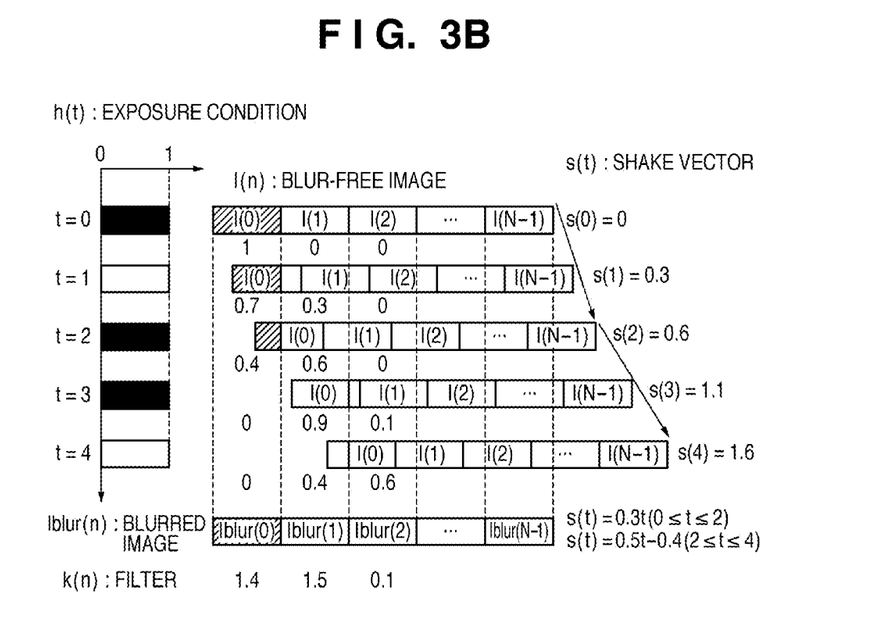
FIG. 3B is a conceptual view of filter calculation.

The calculation procedure of equation (6) will be described here. For the descriptive convenience, one-dimensional processing will be examined. FIG. 3B is a conceptual view for explaining the significance of equation (6) when the interpolation Kernel indicates linear interpolation. FIG. 3B assumes a case in which not the camera but the object moves for the descriptive convenience. However, the concept is the same even for a camera shake. The object is assumed to exhibit non-uniform motion represented by s(t)=0.3 t when 0≤t≤2, and s(t)=0.5 t−0.4 when 2≤t≤4. A shutter close state is represented by h(t)=0, and a shutter open state is represented by h(t)=1. I(n) is a blur-free image, Iblur(n) is an acquired image after image sensing, and h(t) is an exposure condition. Referring to FIG. 3B, a number added under each I(n) represents the degree of contribution of the pixel value I(0) at pixel position x=0 to the pixel value Iblur(0) at pixel position x=n.

Contribution of I(0) at pixel position x=0 to Iblur(0) will be examined first. At t=0, I(0) and Iblur(0) are at the same position, and the degree of contribution is 1, as is apparent from FIG. 3B. At t=1, since I(0) moves by 0.3 pixel to the right, the degree of contribution is 0.7. Similarly, the degree of contribution changes to 0.4 at t=2, and then to 0. Considering the exposure condition, the filter value at pixel position x=0 is calculated in accordance with equation (6) by $$TK(0) = h(0)\phi(0 - 0.3 \times 0) + h(1)\phi(0 - 0.3 \times 1) + \quad (8)$$
$$h(2)\phi(0 - 0.3 \times 2) + h(3)\phi(0 - (0.5 \times 3 - 0.4)) +$$
$$h(4)\phi(0 - (0.5 \times 4 - 0.4))$$
$$= 1 \times 1 + 0 \times 0.7 + 1 \times 0.4 + 1 \times 0 + 0 \times 0 = 1.4$$

That is, in equation (8), the ratio of overlap of I(0) on Iblur(0) at each time t during the exposure time is obtained, and the obtained ratio is multiplied by h(t). The sum of multiplication results (multiplication results of ratios and h(t)) obtained at respective times t during the exposure time is defined as a filter value TK(0) in the filter for Iblur(0). The value φ is calculated using the periodical interpolation Kernel shown in FIG. 3A. From equation (8), the filter K(0)=1.4/T=1.4/5.

Contribution of I(0) to Iblur(1) will be examined next. Since I(0) and Iblur(1) do not overlap at all, the degree of contribution is 0 at t=0, as is apparent from FIG. 3B. Then, I(0) contributes only 0.3 at t=1, 0.6 at t=2, 0.9 at t=3, and 0.4 at t=4. Considering the exposure condition, the filter value at pixel position x=1 is calculated in accordance with equation (6) by $$TK(1) = h(0)\phi(1 - 0.3 \times 0) + h(1)\phi(1 - 0.3 \times 1) + \quad (9)$$
$$h(2)\phi(1 - 0.3 \times 2) + h(3)\phi(1 - (0.5 \times 3 - 0.4)) +$$
$$h(4)\phi(1 - (0.5 \times 4 - 0.4))$$
$$= 1 \times 0 + 0 \times 0.3 + 1 \times 0.6 + 1 \times 0.9 \times 0 \times 0.4 = 1.5$$

That is, in equation (9), the ratio of overlap of I(0) on Iblur(1) at each time t during the exposure time is obtained, and the obtained ratio is multiplied by h(t). The sum of multiplication results (multiplication results of ratios and h(t)) obtained at respective times t during the exposure time is defined as a filter value TK(1) in the filter for Iblur(1). Hence, the filter K(1)=1.5/T=1.5/5.

Contribution of I(0) to Iblur(2) will finally be examined. The degree of contribution is 0 at t=0, as is apparent from FIG. 3B. The degree of contribution is 0 at t=1 and 2 as well. The image then contributes 0.1 at t=3, and 0.6 at t=4. Considering the exposure condition, the filter value at pixel position x=2 is calculated by $$TK(2) = h(0)\phi(2 - 0.3 \times 0) + h(1)\phi(2 - 0.3 \times 1) + \quad (10)$$
$$h(2)\phi(2 - 0.3 \times 2) + h(3)\phi(2 - (0.5 \times 3 - 0.4)) +$$
$$h(4)\phi(2 - (0.5 \times 4 - 0.4))$$
$$= 1 \times 0 + 0 \times 0 + 1 \times 0 + 1 \times 0.1 + 0 \times 0.6 = 0.1$$

That is, in equation (10), the ratio of overlap of I(0) on Iblur(2) at each time t during the exposure time is obtained, and the obtained ratio is multiplied by h(t). The sum of multiplication results (multiplication results of ratios and h(t)) obtained at respective times t during the exposure time is defined as a filter value TK(2) in the filter for Iblur(2). Hence, the filter K(2)=0.1/T=0.1/5. When n≥3, I(0) does not contribute to Iblur(n). Hence, K(n)=0. In this case, the filter K can be obtained by filter K=[1.4,1.5,0.1]/5. The procedure of calculating the filter K has been described above.

Figure 4:
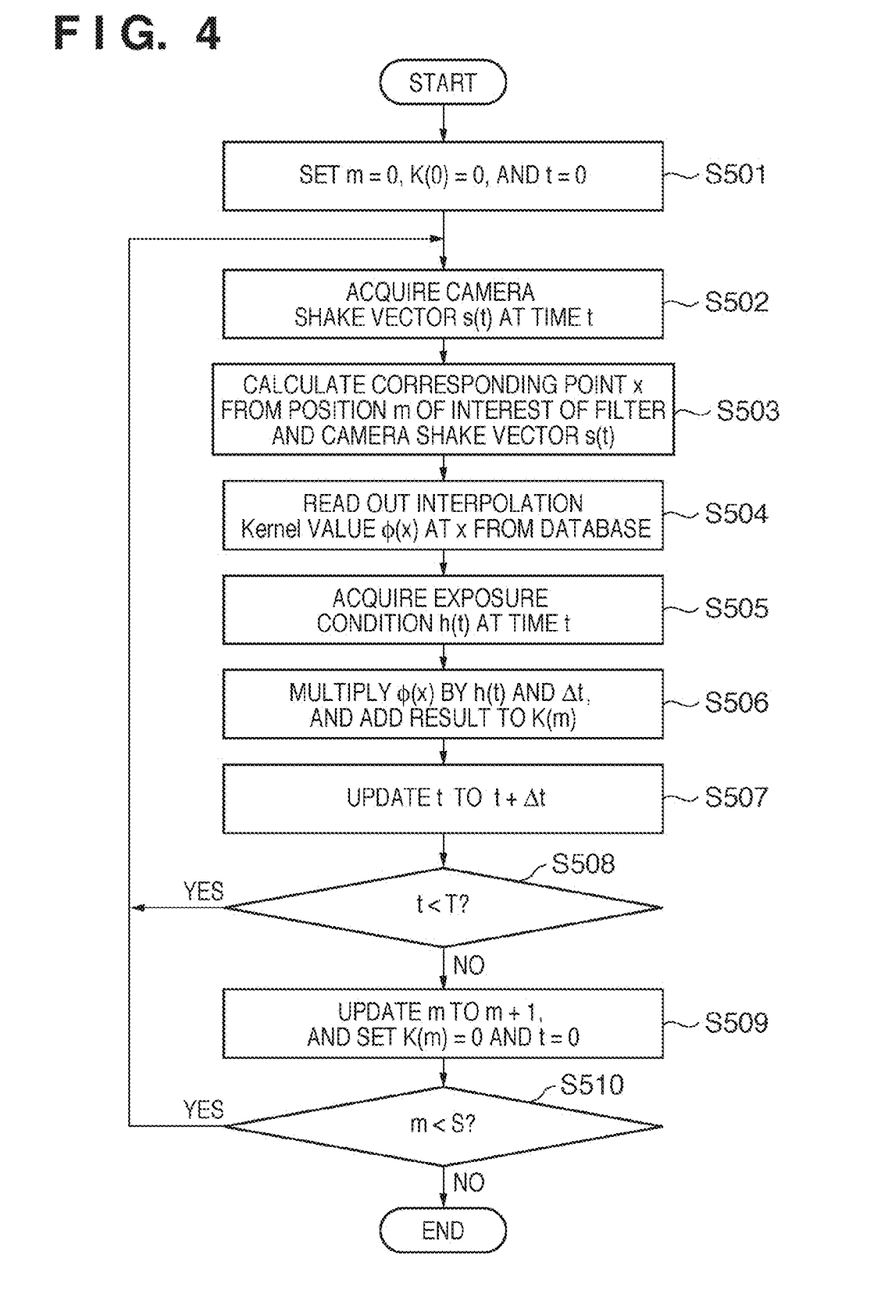
FIG. 4 is a flowchart illustrating the operation of a filter coefficient calculation unit 105.

Processing to be executed by the filter coefficient calculation unit 105 will be described next with reference to the flowchart of FIG. 4. FIG. 4 basically illustrates a procedure of calculating equation (6). For the sake of simplicity, an example of one-dimensional shift in the right (positive) direction will be explained. In this case, the coordinate vector m representing the coordinates of a pixel of interest is also one-dimensional, and can actually be handled as a scalar. The filter coefficient calculation unit 105 acquires exposure condition information and shake vector information at a predetermined time interval $\Delta t$ from the exposure condition recording unit 103 and the shake vector recording unit 102, respectively.

In step S501, all the coordinates m of the pixel of interest, K(m), and time t are initialized to 0. In step S502, the shake vector information (shake vector) s(t) at time t is acquired from the shake vector recording unit 102. In step S503, a difference value x between m and s(t) is calculated. In step S504, the interpolation Kernel value $\phi(x)$ corresponding to the difference value x(=m−s(t)) is read out from the interpolation Kernel DB 104.

The interpolation Kernel DB 104 stores sets of (x,$\phi$(x)), and $\phi(x)$ specifically has the shape shown in FIG. 3A. In step S505, the exposure condition information (exposure condition) h(t) at time t is acquired from the exposure condition recording unit 103. The exposure condition h(t) is represented by an array such as [1, 0, 1, 1, 0, . . . ] for the time t.

In step S506, the interpolation Kernel value $\phi(x)$ acquired in step S504 is multiplied by the exposure condition information h(t) acquired in step S505. The product is multiplied by a time interval $\Delta t$ and added to K(m).

In step S507, the time t is updated by adding $\Delta t$. In step S508, it is determined whether t<T. If t<T, the process returns to step S502. If t≥T, the process advances to step S509.

In step S509, m is updated by adding 1, and the corresponding filter value K(m) and time t are initialized to 0. In step S510, it is determined whether m<S. If m<S, the process returns to step S502. If m≥S, the processing ends. S is the filter size.

The filter size S is normally sufficient if it is almost the same as the number of pixels of a normal shift. However, the filter size S may be set larger, as a precaution. In the above-described example, the value of the pixel m of interest starts from 0 in step S501 because only a shift in the right (positive) direction is taken into consideration. In general, if the shift occurs in the left (negative) direction as well, m may start from a negative value. Because of the periodical condition, the negative pixel value m is interpreted as −1=M−1, −2=M−2, . . . , where M is the image size.

Note that the coordinates of the pixel of interest are expressed by a one-dimensional vector for the descriptive convenience. To express the coordinates of the pixel of interest by a two-dimensional vector, each one-dimensional vector in the above description related to FIG. 4 is replaced with a two-dimensional vector by changing m to (m,n), x to (x,y), and s(t) to (s_x(t),s_y(t)). In this case, the interpolation Kernel $\phi$ is a function of the two-dimensional vector (x,y) as well.

For example, a value calculated as a one-dimensional vector m−s(t) in step S504 is replaced with a two-dimensional vector (m−s_x(t),m−s_y(t)). When the filter size is S_x×S_y, the pixel of interest is updated in step S509 by sorting the two-dimensional region from the upper left to the lower right, like (m,n), (m+1,n), . . . , (m+Sx,n), (1,n+1).

<Exposure Condition>

The exposure condition is set by the function h(t). This function is set to avoid a zero power frequency of the filter K determined by equation (6). This phenomenon poses a problem that the information of the frequency at which the frequency characteristic becomes zero is lost. For example, examine uniform motion in the horizontal direction.

Figure 5A:
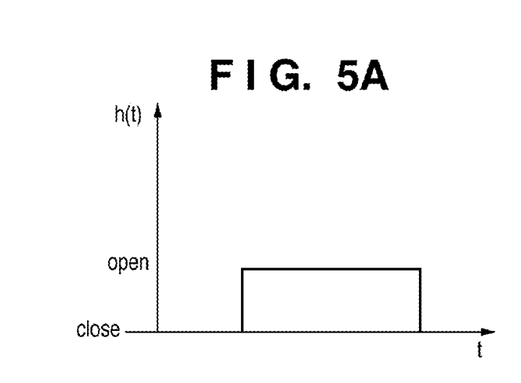
FIG. 5A is a graph showing an example of a normal exposure condition.
Figure 5B:
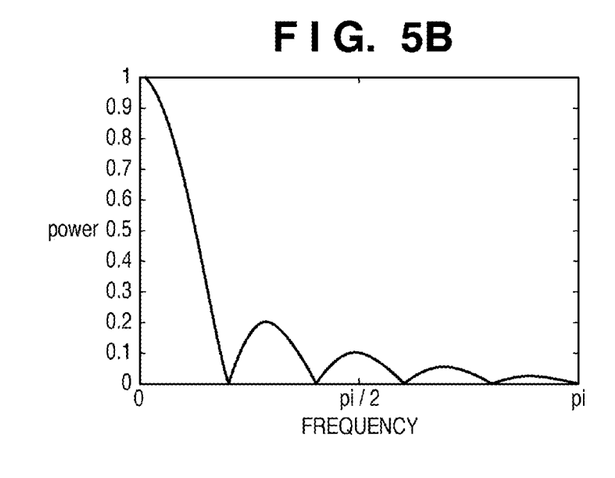
FIG. 5B is a graph showing a filter frequency characteristic.

FIG. 5A shows an example of a normal exposure condition. This indicates opening the shutter for a predetermined time and then closing it. The abscissa represents the time, and the ordinate represents the value h(t). FIG. 5B shows an example in which the filter K is calculated, and the frequency characteristic is obtained under this exposure condition. Referring to FIG. 5B, the abscissa represents the frequency, and the ordinate represents the absolute value of discrete Fourier transformation of the filter K. As is apparent from FIG. 5B, there are frequencies at which the frequency characteristic of the filter K becomes zero so that a zero power frequency is generated.

Figure 6A:
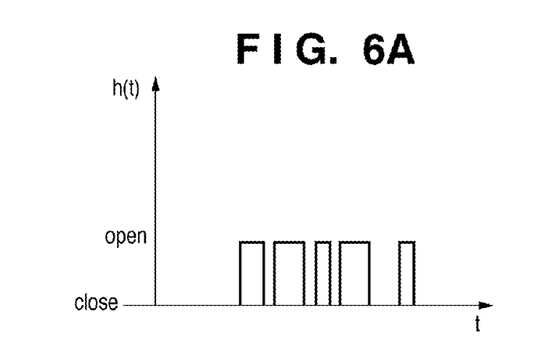
FIG. 6A is a graph showing an example of exposure condition control.
Figure 6B:
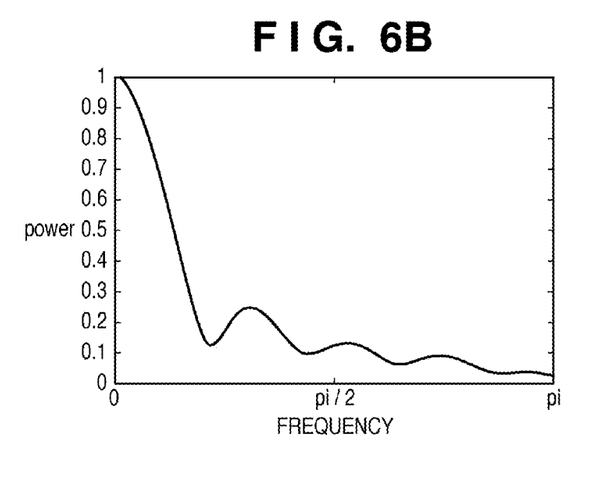
FIG. 6B is a graph showing a filter frequency characteristic.

FIG. 6A shows an example in which the exposure condition h(t) is controlled using Coded Exposure to avoid a zero power frequency. The way of reading the graph is the same as in FIG. 5A. FIG. 6B shows an example in which the frequency characteristic of the filter K is obtained concerning the same shift shake as in FIG. 5A under the exposure condition. The way of reading the graph is the same as in FIG. 5B. Thus controlling the exposure condition h(t) makes it possible to prevent the value of the frequency characteristic of the filter K from becoming zero.

Since only the shutter open/close state is controlled, the value h(t) is limited to 0 and 1. However, another method may be used to change the value h(t) to an intermediate value between 0 and 1.

Figure 7A:
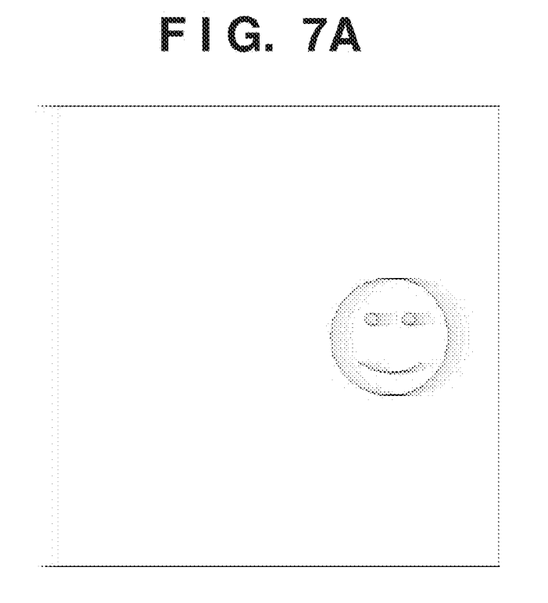
FIGS. 7A and 7B are views showing the effect of the first embodiment.
Figure 7B:
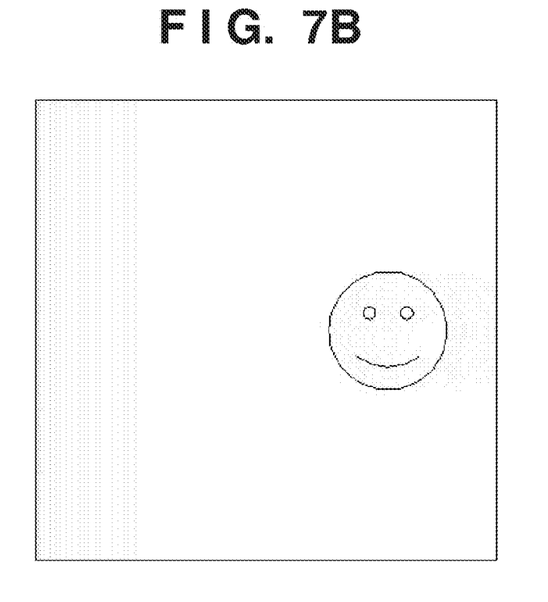

FIGS. 7A and 7B show the effect of the first embodiment. FIG. 7A illustrates an image having a horizontal shift shake of uniformly accelerated motion. FIG. 7B illustrates an image whose shift shake has been corrected according to the embodiment. As is apparent from FIGS. 7A and 7B, the camera shake is satisfactorily corrected in non-uniform motion.

As described above, according to the embodiment, it is possible to correct a shift shake from only one image using the interpolation Kernel, shake vector, and exposure condition. This allows to satisfactorily correct the shake even in non-inform motion.

According to the first embodiment, in summary, exposure condition information and shake vector information collected at the time interval $\Delta t$ during image sensing are acquired first. An interpolation Kernel value corresponding to a position determined by the difference between the position of interest in the filter and a shake vector represented by shake vector information at time $\Delta t \times n$ (n=1, 2, . . . , T/$\Delta t$) is acquired. The multiplication result of exposure condition information at time $\Delta t \times n$, the interpolation Kernel value, and $\Delta t$ is added to the coefficient at the position of interest in the filter. The processing of "acquiring the interpolation Kernel value" and the processing of "adding the multiplication result to the coefficient at the position of interest in the filter" are performed for n=1, 2, . . . , T/$\Delta t$, thereby determining the coefficient at the position of interest in the filter (first calculation). In addition, the processing of "acquiring the interpolation Kernel value", the processing of "adding the multiplication result to the coefficient at the position of interest in the filter", and the first calculation are performed for all positions of the filter, thereby determining all coefficients in the filter (second calculation). Finally, to correct the image blur, deconvolution of the image and the filter determined by the second calculation is performed.

[Second Embodiment]

In this embodiment, an image sensing system incorporating the image processing apparatus described in the first embodiment will be explained. An example of the functional arrangement of an image sensing unit 1100 provided in the image sensing system according to this embodiment will be described with reference to FIG. 8.

Figure 8:
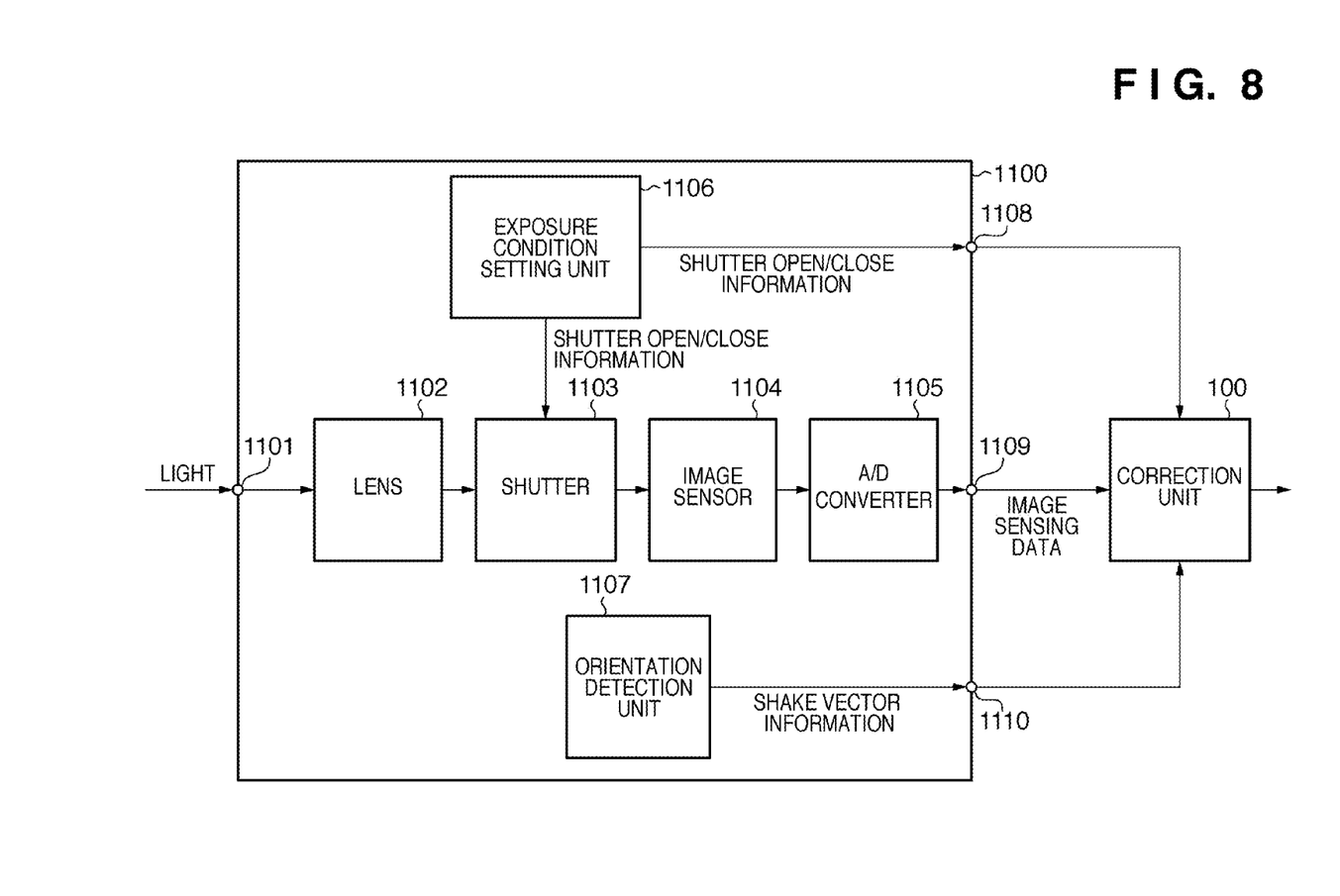
FIG. 8 is a block diagram showing an image sensing system according to the second embodiment.

Light reflected by an image sensing target object enters an image sensor 1104 via an input terminal 1101, lens 1102, and shutter 1103. The image sensor 1104 outputs an analog signal corresponding to the incident light. An A/D converter 1105 converts the analog signal into a digital signal. The digital signal is input to a correction unit 100 via an output terminal 1109 as image sensing data.

An exposure condition setting unit 1106 sets an exposure condition. Information representing the set exposure condition is input to the shutter 1103 and also to the correction unit 100 via an output terminal 1108 as exposure condition information.

An orientation detection unit 1107 detects a shake of the image sensing unit 1100. Information representing the detected shake is input to the correction unit 100 via an output terminal 1110 as the shake vector information.

In this embodiment, the orientation detection unit 1107 detects a camera shake. The orientation detection unit 1107 may be either a device for measuring motion or a device for acquiring a plurality of images and estimating motion using the acquired images. When the shake vector information and exposure condition information are sent to the correction unit 100, the correction unit 100 executes the processing described in the first embodiment using these pieces of information, thereby correcting the blur of image sensing data. As described above, according to this embodiment, it is possible to correct a camera shake without including an optical anti-vibration mechanism in the image sensing system.

[Third Embodiment]

In the second embodiment, optical anti-vibration is not taken into consideration. In the third embodiment, however, an image sensing system combined with optical anti-vibration will be described. An example of the functional arrangement of an image sensing unit 1200 provided in the image sensing system according to the embodiment will be described with reference to FIG. 9. The same reference numerals as in FIG. 8 denote the same parts in FIG. 9, and a description thereof will not be repeated.

Figure 9:
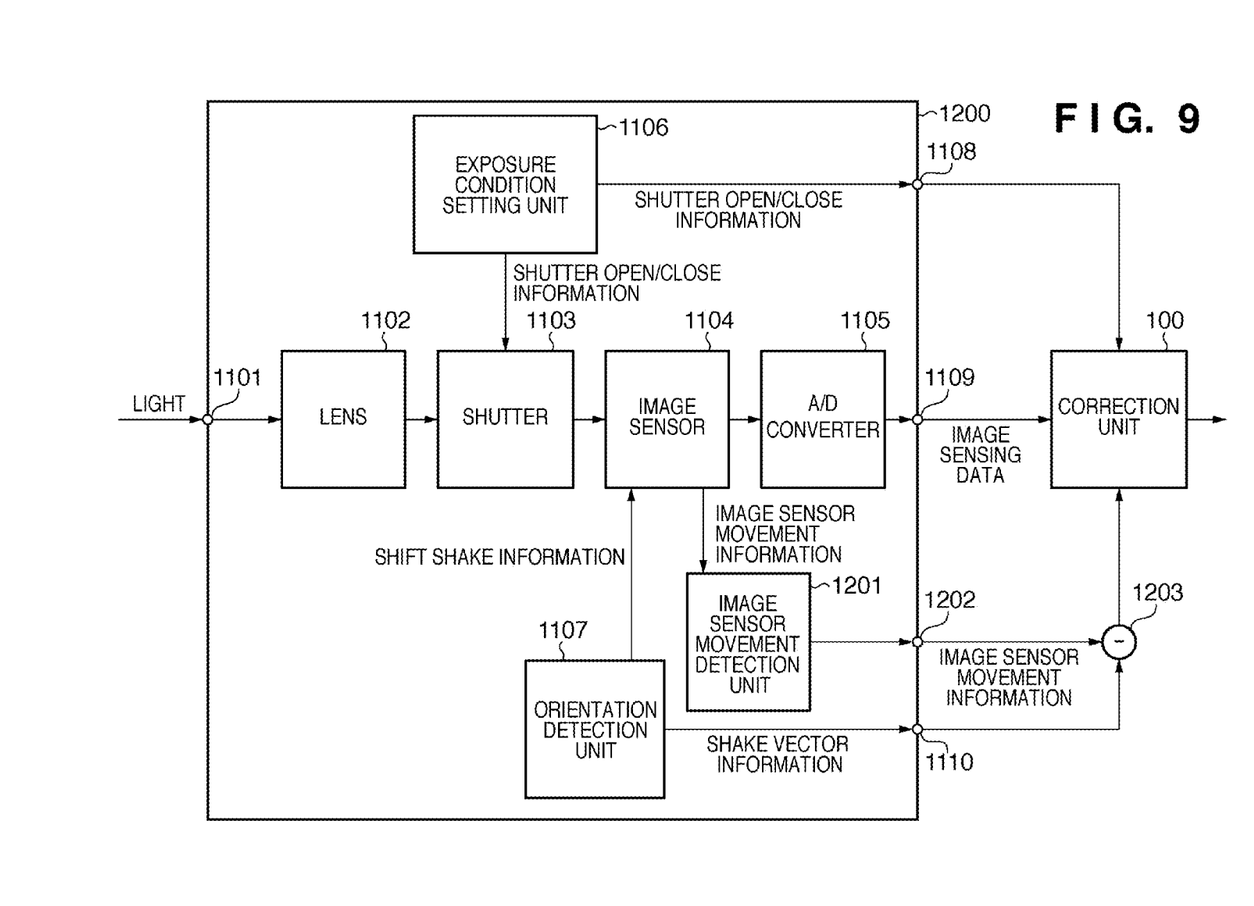
FIG. 9 is a block diagram showing an image sensing system according to the third embodiment.

An image sensor movement detection unit 1201 detects the movement of an image sensor 1104, and outputs the detection result to a subtractor 1203 via an output terminal 1202 as image sensor movement information. The subtractor 1203 subtracts the image sensor movement information detected by the image sensor movement detection unit 1201 from shake vector information detected by an orientation detection unit 1107. The subtraction result is input to a correction unit 100.

In this embodiment, the shake vector information detected by the orientation detection unit 1107 is sent to the image sensor 1104 as shift shake information. The image sensor 1104 moves in a direction of decreasing the shift shake in accordance with the shift shake information. The camera shake is thus corrected. The image sensor movement detection unit 1201 detects the motion vector of the image sensor 1104, and sends the detection result to the subtractor 1203 via the output terminal 1202. The shake vector information of the image sensing system itself detected by the orientation detection unit 1107 is sent to the subtractor 1203 via an output terminal 1110. The subtractor 1203 calculates the difference between the shake vector information and the image sensor movement information, as described above, and sends it to the correction unit 100. The correction unit 100 corrects a camera shake that cannot completely be removed by optical anti-vibration.

In this embodiment, a method of correcting a camera shake by the image sensor 1104 has been described. However, a camera shake may be corrected by a lens 1102. In this case, a lens movement detection unit is provided in place of the image sensor movement detection unit 1201 so as to measure the lens moving amount and output it to the subtractor 1203 instead of image sensor movement information. That is, the method is not limited as far as a camera shake can be corrected by the image sensing unit.

As described above, according to this embodiment, optical anti-vibration can partially correct a camera shake, and the correction unit 100 can correct a camera shake that cannot completely be corrected by the optical anti-vibration. This allows to accurately correct even a large camera shake.

[Fourth Embodiment]

In the first embodiment, the shake is limited to a shift shake. In the fourth embodiment, however, an image processing apparatus for correcting a rotational shake will be described. An arrangement of shake correction by the image processing apparatus according to this embodiment will be explained with reference to FIG. 10.

Figure 10:
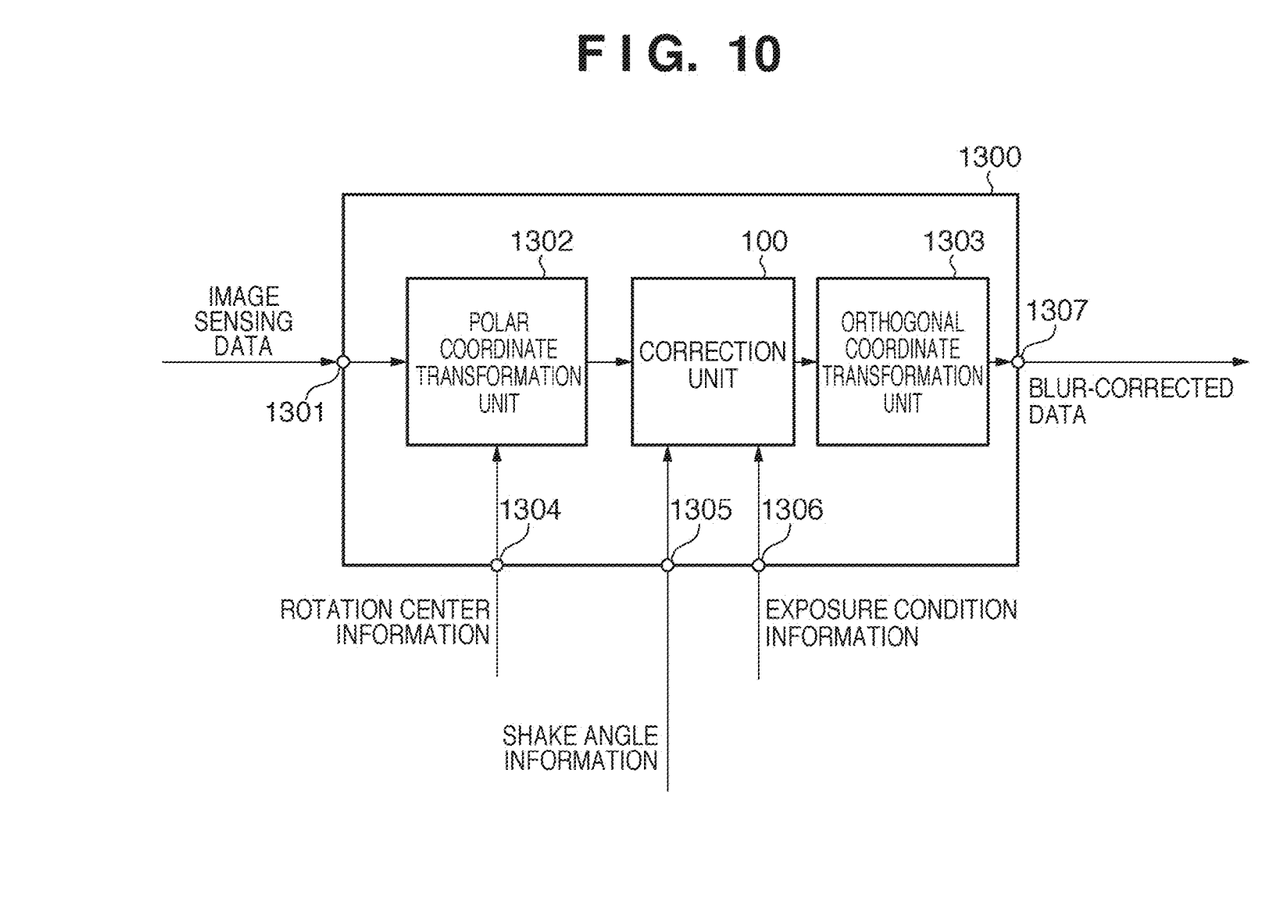
FIG. 10 is a block diagram showing an image processing apparatus according to the fourth embodiment.

Image sensing data is input to a polar coordinate transformation unit 1302 via an input terminal 1301. The polar coordinate transformation unit 1302 converts the image sensing data from data on orthogonal coordinates into data on polar coordinates using rotation center information representing the position of rotation center and input via an input terminal 1304. A correction unit 100 performs the same shake correction processing as in the first embodiment for the image sensing data converted by the polar coordinate transformation unit 1302 using shake angle information input via an input terminal 1305 and exposure condition information input via an input terminal 1306.

An orthogonal coordinate transformation unit 1303 converts the image sensing data that has undergone shake correction of the correction unit 100 from data on polar coordinates into data on orthogonal coordinates. The image sensing data converted by the orthogonal coordinate transformation unit 1303 is output to a display device or memory via an output terminal 1307 as blur-corrected data.

Figure 11:
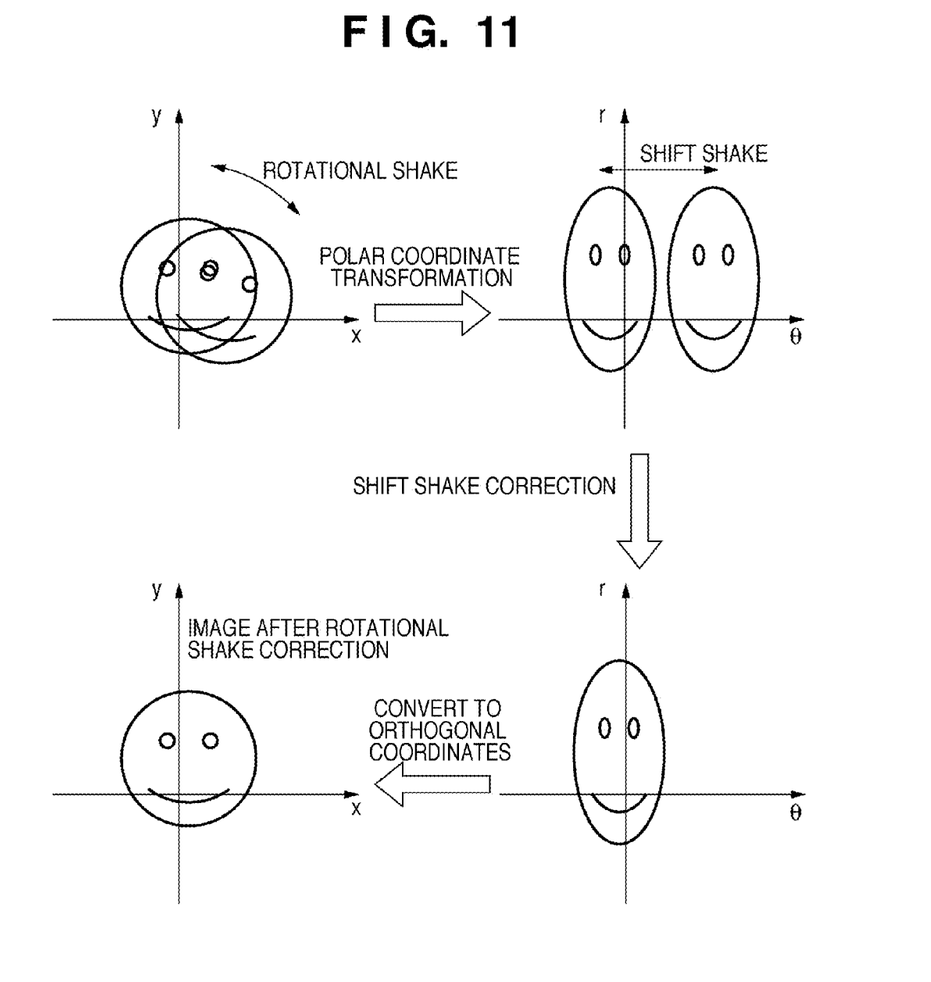
FIG. 11 is a conceptual view of the fourth embodiment.

The processing of correcting a rotational shake will be described with reference to FIG. 11. Referring to FIG. 11, a rotational shake can be converted into a one-dimensional shift shake by polar coordinate transformation. The shift shake is corrected by shake correction processing described in the first embodiment, and the polar coordinates are converted into orthogonal coordinates, thereby correcting the rotational shake.

As described above, according to this embodiment, a rotational shake can be corrected. Note that when this embodiment is combined with an image sensing system, a camera shake can partially be removed by optical anti-vibration, and the remaining rotational shake can be corrected by the method of this embodiment, as in the third embodiment, as a matter of course.

[Fifth Embodiment]

Figure 12A:
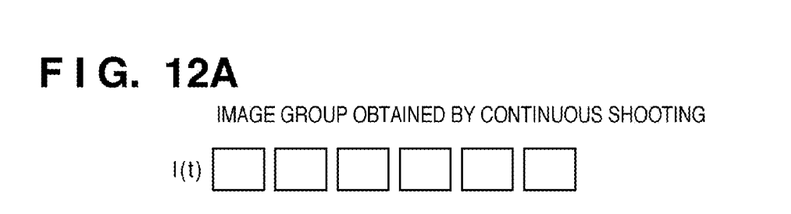
FIGS. 12A to 12C are conceptual views of the fifth embodiment.
Figure 12B:
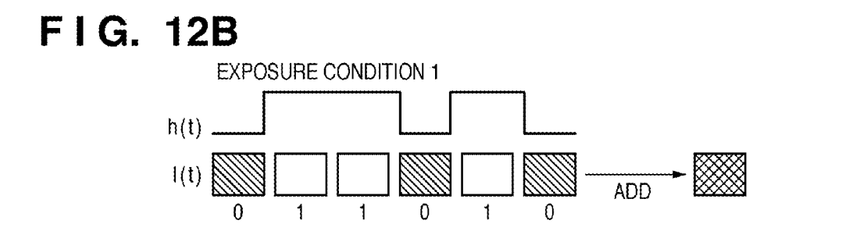
Figure 12C:
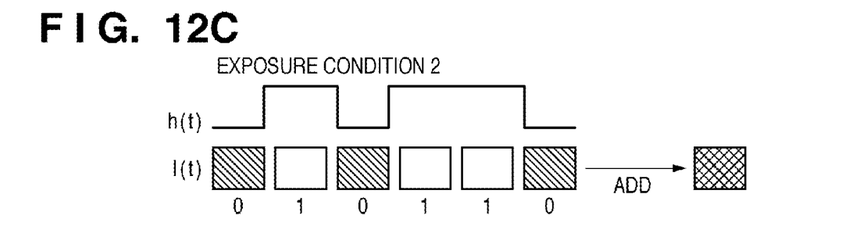

In this embodiment, an example of a method of controlling an exposure condition h(t) will be described. This embodiment is applicable to the first to fourth embodiments. In this embodiment, the exposure condition is controlled not by opening/closing the shutter but by selectively adding and compositing images obtained by continuous shooting. The series of processes will be explained with reference to FIGS. 12A to 12C. FIG. 12A shows images obtained by continuous shooting and time-divisional exposure. FIGS. 12B and 12C show states in which the time-divisionally exposed images are appropriately selected and composed by addition. Referring to FIGS. 12B and 12C, an image with "0" under it is excluded from the addition target, and an image with "1" under it is included in the addition target. As is apparent from FIGS. 12B and 12C, various Coded Exposure patterns can be generated by the way the time-divided images are selected. As described above, according to this embodiment, images obtained by continuous shooting are selectively composited by addition, thereby acquiring images sensed under various exposure conditions.

[Sixth Embodiment]

In this embodiment, a case will be described in which the processing described in the first and fourth embodiments is implemented by software. More specifically, a correction unit 100 is stored in a computer as a computer program, and a CPU provided in the computer executes the computer program.

Figure 13:
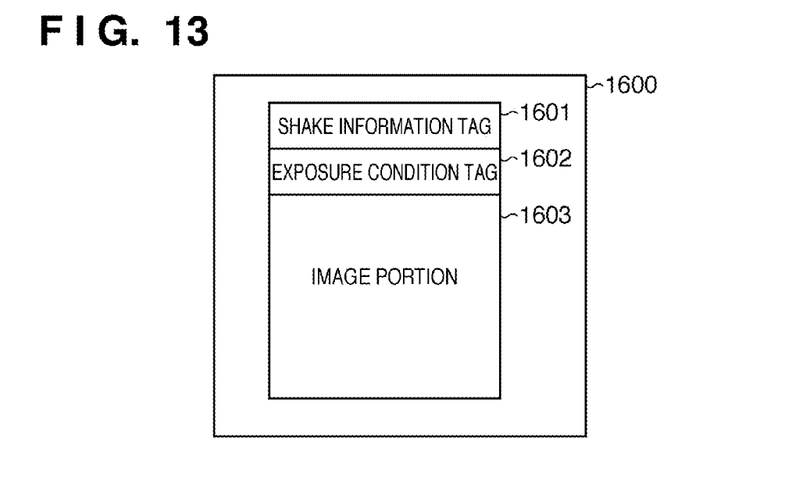
FIG. 13 is a view showing an image file format according to the sixth embodiment.

In this embodiment, an image file 1600 as shown in FIG. 13 is input to the apparatus that executes the software. The image file 1600 includes a tag 1601 that stores shake vector information, a tag 1602 that stores exposure condition information, and a tag 1603 that stores a sensed image.

When the image file 1600 is input to the apparatus, the computer program corresponding to the correction unit 100 executes processing of correcting a blur of the image stored in the tag 1603 using the information stored in the tags 1601 and 1602. The blur-corrected image is then output to a display device or memory. As described above, according to this embodiment, it is possible to read an image file of the above-described format on the software, and automatically correct a blur.

According to the above-described embodiments, in summary, an interpolation Kernel is prepared to cope with a camera shake of general non-uniformly accelerated motion while making use of the advantages of Coded Exposure. A filter is calculated based on the locus of camera shake and the exposure condition, and shake correction is performed using the filter. Controlling the exposure condition enables to avoid the problem of zero power frequency. Using the interpolation Kernel enables to easily cope with a camera shake of arbitrary motion.

That is, when it is possible to cope with a camera shake of arbitrary motion, the embodiments are guaranteed even when the exposure time is long. Generally, the motion of camera shake is not uniform but non-uniform motion. In a short exposure time, however, the motion of camera shake can be regarded as uniform motion. For this reason, the conventional technique that does not cope with a camera shake of nonuniform motion can cope with a short exposure time in which the motion of camera shake can be regarded as uniform motion. However, the technique cannot cope with a long exposure time that the motion of camera shake cannot be regarded as uniform motion.

From this viewpoint, the image processing apparatus described in the above embodiments copes with a camera shake of non-uniform motion, and can therefore cope with a long exposure time as well. That is, according to the embodiment, even when the exposure time is longer, a camera shake can be corrected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-272801 filed Nov. 30, 2009 which is hereby incorporated by reference herein in its entirety.

What is claimed is:

1. An image processing apparatus comprising:
an exposure condition input unit that inputs an exposure condition when obtaining a sensed image;
a shake information input unit that inputs shake information when obtaining the sensed image; and
a filter generation unit that generates a filter to be used to correct a blur of the sensed image based on the exposure condition and a weight value including a non-integer, wherein the weight value including a non-integer is obtained from an interpolation Kernel and the shake information.

2. The apparatus according to claim 1, wherein the shake information is defined in a unit finer than a unit of a pixel of an image sensing device for obtaining the sensed image.

3. The apparatus according to claim 1, wherein the filter is an inverse filter of a filter being used to change a blur-free image to the sensed image.

4. The apparatus according to claim 1, wherein the shake information is one of camera shake vector information and shake vector information obtained by correcting the camera shake vector information based on optical anti-vibration.

5. The apparatus according to claim 1, wherein the sensed image is an image that has undergone polar coordinate transformation, and
wherein the apparatus further comprises a unit that performs orthogonal coordinate transformation for an image obtained by deconvolution processing of the filter and the sensed image.

6. An image processing method comprising the steps of:
inputting an exposure condition when obtaining a sensed image;
inputting shake information when obtaining the sensed image; and
generating a filter to be used to correct a blur of the sensed image based on the exposure condition and a weight value including a non-integer, wherein the weight value including a non-integer is obtained from an interpolation Kernel and the shake information.

7. A non-transitory computer-readable storage medium storing a computer program that causes a computer to function as each unit of an image processing apparatus of claim 1.

8. An image processing apparatus comprising:
  an image input unit that inputs a plurality of continuous shooting images;
  an exposure condition input unit that inputs an exposure condition defining a selection pattern of composition target images, out of the plurality of continuous shooting images, to be composed to generate a composition image;
  a shake information input unit that inputs shake information of the inputted shooting images;
  a filter generation unit that generates a filter to be used to correct a blur of the composition image based on the exposure condition and a weight value which includes a non-integer and is obtained from an interpolation Kernel and the shake information.

9. The image processing apparatus according to claim 8, wherein the filter is an inverse filter of a filter being used to change a blur-free image to the composition image.

10. An image processing method comprising:
  an image input step of inputting a plurality of continuous shooting images;
  an exposure condition input step of inputting an exposure condition defining a selection pattern of composition target images, out of the plurality of continuous shooting images, to be composed to generate a composition image;
  a shake information input step of inputting shake information of the inputted shooting images;
  a filter generation step of generating a filter to be used to correct a blur of the composition image based on the exposure condition and a weight value which includes a non-integer and is obtained from an interpolation Kernel and the shake information.

11. An image processing apparatus comprising:
  an exposure condition input unit that inputs an exposure condition defining an open/close pattern of a shutter, wherein the open/close pattern indicates a pattern of an open/close of the shutter performed for obtaining a single sensed image;
  a shake information input unit that inputs shake information when obtaining the single sensed image; and
  a filter generation unit that generates a filter to be used to correct a blur of the single sensed image based on the exposure condition and a weight value to correct the single sensed image by using the generated filter,
  wherein the weight value includes a non-integer and is obtained from an interpolation Kernel and the shake information.

12. The image processing apparatus according to claim 11 wherein the filter is an inverse filter of a filter being used to change a blur-free image to the single sensed image.

13. An image processing method comprising:
  an exposure condition input step of inputting an exposure condition defining an open/close pattern of a shutter, wherein the open/close pattern indicates a pattern of an open/close of the shutter performed for obtaining a single sensed image;
  a shake information input step of inputting shake information when obtaining the single sensed image; and
  a filter generation step of generating a filter to be used to correct a blur of the single sensed image based on the exposure condition and a weight value to correct the single sensed image by using the generated filter,
  wherein the weight value includes a non-integer and is obtained from an interpolation Kernel and the shake information.

* * * * *